(12) United States Patent
Lorenz et al.

(10) Patent No.: US 10,457,775 B2
(45) Date of Patent: Oct. 29, 2019

(54) METHOD FOR PRODUCING HIGH MOLECULAR WEIGHT POLYOXYALKYLENE POLYOLS

(71) Applicant: Covestro Deutschland AG, Leverkusen (DE)

(72) Inventors: Klaus Lorenz, Dormagen (DE); Christian Steinlein, Ratingen (DE); Horst Zwick, Dormagen (DE); Markus Bodenmüller, Krefeld (DE); Stephan Eckelmann, Pulheim (DE); Friedhelm Baer, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 76 days.

(21) Appl. No.: 15/754,491

(22) PCT Filed: Aug. 23, 2016

(86) PCT No.: PCT/EP2016/069878
§ 371 (c)(1),
(2) Date: Feb. 22, 2018

(87) PCT Pub. No.: WO2017/032768
PCT Pub. Date: Mar. 2, 2017

(65) Prior Publication Data
US 2018/0244842 A1    Aug. 30, 2018

(30) Foreign Application Priority Data
Aug. 26, 2015    (EP) ..................... 15182451

(51) Int. Cl.
C08G 65/26    (2006.01)

(52) U.S. Cl.
CPC ...... *C08G 65/2606* (2013.01); *C08G 65/2663* (2013.01); *C08G 65/2696* (2013.01); C08G 2650/24 (2013.01); C08G 2650/58 (2013.01)

(58) Field of Classification Search
CPC ............ C08G 65/2606; C08G 65/2663; C08G 65/2696; C08G 2650/58; C08G 2650/24
See application file for complete search history.

(56) References Cited

U.S. PATENT DOCUMENTS

| 3,404,109 | A | 10/1968 | Milgrom |
| 3,538,043 | A | 11/1970 | Herold |

(Continued)

FOREIGN PATENT DOCUMENTS

| EP | 0406440 A1 | 1/1991 |
| JP | 04-145123 A | 5/1992 |
| WO | 2004029131 A1 | 4/2004 |

OTHER PUBLICATIONS

Handbuch Apparate [Apparatus Handbook]; Vulkan-Verlag Essen, 1st ed. (1990), p. 188-208.

(Continued)

*Primary Examiner* — Shane Fang
(74) *Attorney, Agent, or Firm* — N. Denise Brown (57) ABSTRACT

The invention relates to an efficient method for producing polyoxyalkylene polyols with equivalent molar masses between 9500 and 23000 g/mol from one or more H-functional starter compounds, and one or more alkylene oxides in the presence of a double metal cyanide catalyst, characterized in that the alkylene oxide metering rate is reduced once a calculated equivalent molar mass of between 8000 and 9500 g/mol is reached.

19 Claims, 2 Drawing Sheets

(56) References Cited

U.S. PATENT DOCUMENTS

| | | |
|---|---|---|
| 3,829,505 A | 8/1974 | Herold |
| 3,941,849 A | 3/1976 | Herold |
| 4,355,188 A | 10/1982 | Herold et al. |
| 4,500,704 A | 2/1985 | Kruper, Jr. et al. |
| 4,721,818 A | 1/1988 | Harper et al. |
| 4,826,953 A | 5/1989 | Kuyper et al. |
| 4,877,906 A | 10/1989 | Harper |
| 4,985,491 A | 1/1991 | Reisch |
| 4,987,271 A | 1/1991 | Watabe et al. |
| 5,010,047 A | 4/1991 | Schuchardt |
| 5,032,671 A | 7/1991 | Harper |
| 5,096,993 A | 3/1992 | Smith et al. |
| 5,099,075 A | 3/1992 | Katz et al. |
| 5,100,997 A | 3/1992 | Reisch et al. |
| 5,124,425 A | 6/1992 | Higuchi et al. |
| 5,158,922 A | 10/1992 | Hinney et al. |
| 5,391,722 A | 2/1995 | Chandalia et al. |
| 5,470,813 A | 11/1995 | LeKhac |
| 5,536,883 A | 7/1996 | Le-Khac |
| 5,627,120 A | 5/1997 | Le-Khac |
| 5,637,673 A | 6/1997 | Le-Khac |
| 5,714,428 A | 2/1998 | Le-Khac |
| 5,767,323 A | 6/1998 | Televantos et al. |
| 6,018,017 A | 1/2000 | Le-Khac |
| 6,077,978 A | 6/2000 | McDaniel et al. |
| 6,368,714 B1 | 4/2002 | Robertson et al. |
| 6,646,100 B2 | 11/2003 | Hoffmann et al. |
| 6,710,096 B2 | 3/2004 | Neff et al. |
| 6,734,219 B2 | 5/2004 | Wada et al. |
| 6,780,813 B1 | 8/2004 | Hoffmann et al. |
| 6,835,687 B2 | 12/2004 | Hofmann et al. |
| 7,008,900 B1 | 3/2006 | Hofmann et al. |
| 8,134,022 B2 | 3/2012 | Haider et al. |
| 8,946,466 B2 | 2/2015 | Gürtler et al. |
| 9,139,691 B2 | 9/2015 | Lorenz et al. |
| 2007/0276099 A1* | 11/2007 | Lorenz ............... B01J 27/26 525/438 |
| 2015/0038664 A1 | 2/2015 | Hayashi et al. |

OTHER PUBLICATIONS

Ullmann's Encyclopedia of Industrial Chemistry, vol. B4, pp. 167 ff., 5th ed., 1992.

Translation of letter to European Patent Office, Munich, dated Apr. 24, 2018; Communication pursuant to Rule 114(2) EPC; 3rd Party Observations; Application No./Patent No. 16754509.4-1107.

Translation of EPO Office Action; Communication pursuant to Article 94(3) EPC; Application No. 16754509.4-1107; dated Dec. 21, 2018.

* cited by examiner

METHOD FOR PRODUCING HIGH MOLECULAR WEIGHT POLYOXYALKYLENE POLYOLS

CROSS-REFERENCE TO RELATED APPLICATIONS

This application is a national stage application under 35 U.S.C. § 371 of PCT/EP2016/069878, filed Aug. 23, 2016, which claims the benefit of European Application No. 15182451.3, filed Aug. 26, 2015, both of which are being incorporated by reference herein.

FIELD

The present invention provides an improved process for preparing polyoxyalkylene polyols having calculated equivalent molar masses of 9500 to 23 000 g/mol, preferably of 9500 to 20 000 g/mol, more preferably of 9700 to 16 000 g/mol.

BACKGROUND

Polyoxyalkylene polyols suitable for the preparation of polyurethanes can be obtained via various preparation processes. One process of significance on the industrial scale is the base-catalyzed addition of alkylene oxides onto H-functional starter compounds, and another is the use of double metal cyanide compounds as catalysts ("DMC catalysts") for the addition of alkylene oxides onto H-functional starter compounds. The (Lewis) acid-catalyzed addition of alkylene oxides onto suitable starter compounds is of minor importance.

Under alkali metal hydroxide catalysis, there is a distinct increase in unwanted side reactions with rising molar mass of the polymer. Particular mention should be made here of the isomerization of propylene oxide to allyl alcohol, which, at high equivalent molar masses (or low OH numbers), leads to a high proportion of monofunctional polyoxyalkylene species in the reaction mixture and hence to significant lowering of the functionality. The monofunctional polyoxyalkylene molecules therefore have an adverse effect on the through-curing characteristics and the profile of physical properties of polyurethane systems or other materials producible from these polyoxyalkylene compounds, for example silane-based sealants that are curable under the action of air humidity.

The use of DMC catalysts has made it possible to advance the addition of alkylene oxides, especially propylene oxide, onto H-functional starter compounds down to very low OH numbers, i.e. high equivalent molar masses, without any significant degree of occurrence of the abovementioned isomerization of propylene oxide to allyl alcohol. Highly active DMC catalysts which are described, for example, in U.S. Pat. No. 5,470,813, EP-A 700949, EP-A 743093, EP-A 761708, WO-A 97/40086, WO-A 98/16310 and WO-A 00/47649 additionally have exceptionally high activity and enable polyoxyalkylene polyol preparation at very low catalyst concentrations (100 ppm or less), such that removal of the catalyst from the finished product is no longer required. A typical example is that of the highly active DMC catalysts which are described in EP-A 700949 and contain not only a double metal cyanide compound (e.g. zinc hexacyanocobaltate(III)) and an organic complex ligand (e.g. tert-butanol) but also a polyoxyalkylene compound having a number-average molecular weight greater than 500 g/mol.

The equivalent molar mass of materials containing active hydrogen atoms is understood to mean the total mass of the material containing active hydrogen atoms divided by the number of active hydrogen atoms. In the case of materials containing hydroxyl groups (for example polyoxyalkylene polyols), they are related to the OH number (hydroxyl number) as follows:

equivalent molar mass=56100/(OH number [mg KOH/g])  (I)

The equivalent molar mass of the polyoxyalkylene polyols is thus ascertained according to formula (I), where the hydroxyl number of the polyoxyalkylene polyol is determined according to DIN 53240. The calculated equivalent molar mass is determined by inserting the calculated OH number into formula (I). The calculated OH number (OH number$_{calc}$) is determined by formula (II):

OH number$_{calc}$=((mass of the starter used)×(OH number of the starter))/(total mass of polymerization batch)  (II)

In the present patent specification, reference is made to the calculated equivalent molar mass since even DMC catalysts cannot convert alkylene oxides to polyoxyalkylenes completely without side reactions. This is naturally manifested particularly in the high target equivalent molar masses under consideration in the present patent specification.

The DMC-catalyzed preparation of alkylene oxide addition products having high equivalent molar masses and the use thereof for preparation of polyurethane- or polyurea-based materials are known to those skilled in the art. For example, DE-A 4117679 and U.S. Pat. No. 5,096,993 disclose the use of polyhydroxy or polyamine compounds having molar masses of up to 30 000 Da for preparation of soft polyurethane or polyurea elastomers by the reactive injection molding process ("RIM" methodology). WO-A 9104997 discloses polyoxyalkylenetriols having molar masses of up to 30000 Da as polyoxyalkylene component of isocyanate-terminated prepolymers which are used in high-quality polyurethane sealant systems. EP-A 1316573 discloses a process for obtaining rapidly demoldable flexible foam bodies having good sustained use properties, the production of which involves using polyoxyalkylene polyols having equivalent molar masses of preferably 5000 to 11 000 Da that have been prepared by DMC catalysis as polyol component. EP-A 0425694 discloses isocyanate-terminated polyoxyalkylene prepolymers, the polyoxyalkylene component of which has equivalent molar masses of up to 15 000 Da. Polyoxyalkylene polyols of this kind are obtained via DMC catalysis. Polyoxyalkylenes prepared via DMC catalysis and having equivalent molar masses of up to 15 000 Da are used in EP-A 0723561 as starting compounds for production of moisture-curing sealant systems based on polymers containing silane groups.

In the DMC-catalyzed preparation of polyoxyalkylene polyols having very high calculated equivalent molar masses (9500 Da or higher), the achievement of processible viscosities becomes problematic with increasing calculated equivalent weight. WO-A 2013/000915 proposes solving this problem by metering the alkylene oxides into the reactor within 15 to 23 h. If the alkylene oxides are supplied to the reactor within this metering time window, it is indeed possible to obtain polyoxyalkylene polyols of relatively low viscosity with high calculated equivalent molar masses. However, a distinct disadvantage of this process is the long run time of the individual polymerization batches which limits the plant capacity (space-time yield).

SUMMARY

It was therefore an object of the present invention to provide a preparation process, optimized for the achievement of minimum viscosities and batch run times of ≤13 h, preferably ≤12 h, more preferably ≤11 h, for polyoxyalkylene polyols having calculated equivalent molar masses of 9500 to 23 000 g/mol, preferably of 9500 to 20 000 g/mol, more preferably of 9700 to 16 000 g/mol. The object is surprisingly achieved by a process for preparing a polyoxyalkylene polyol by reacting at least one H-functional starter compound with at least one alkylene oxide in the presence of a double metal cyanide catalyst in a reactor, by supplying the reactor continuously or discontinuously with the at least one alkylene oxide from a time $t_1$ until a time $t_3$, and by already commencing supply of the reactor with a portion of the total amount of the at least one alkylene oxide to be fed in for preparation of the desired polyoxyalkylene polyol from an earlier time $t_0 \leq t_1$, characterized in that from a time $t_2$ the mean metering rate $r_{AO}$ with which the at least one alkylene oxide is supplied to the reactor is always not more than 42 h$^{-1}$, where $t_3 \geq t_2 \geq t_1$, preferably $t_3 > t_2 > t_1$, and $$r_{AO} = \frac{n_{AO}}{n_{OH} \cdot \Delta t} \cdot OHN_{target} / (mg_{KOH} \cdot g^{-1})$$

with

Δt: period of time from $t_2$ until the time of ending of the alkylene oxide addition ($t_3$) in h, $n_{AO}$: molar amount n of alkylene oxide in mol added in total over the period of time Δt, $n_{OH}$: total molar amount n of hydroxyl groups in the starter compound used in mol, $$OHN_{target} = \frac{m_S \cdot OHN_S}{m_R};$$

$OHN_S$: hydroxyl number of the at least one starter compound in mg KOH/g, $m_S$: total mass of the at least one starter compound used in g, $m_R$: total mass of all reactants supplied to the reactor after ending of the alkylene oxide addition in g, where the time $t_2$ is chosen such that the polyoxyalkylene polyol present in the reactor at this time has a calculated equivalent molar mass $M(t_2)_{equiv.}^{calc.}$ in the range from 8000 g·mol$^{-1}$ to 9500 g·mol$^{-1}$, where, in addition, the at least one alkylene oxide from the time $t_1$ and at least until the time corresponding to the attainment of a calculated equivalent molar mass $M(t)_{equiv.}^{calc.}$ of 8000 g·mol$^{-1}$ and at most until the time corresponding to the attainment of a calculated equivalent molar mass $M(t)_{equiv.}^{calc.}$ of 9500 g·mol$^{-1}$ is supplied to the reactor so as to attain a total alkylene oxide metering time, defined as the period of time $\Delta t_{30} = t_3 - t_0$, of 0.5 h to 13 h, preferably of 1 h to 12 h, more preferably 1.5 h to 11 h, where $$M(t)_{equiv.}^{calc.} = \frac{m_R^t}{m_S \cdot OHN_S} \cdot (56100 \text{ mg}_{KOH} \cdot \text{mol}^{-1})$$

with $m_R^t$: total mass of all reactants supplied to the reactor up to a given time t in g.

DETAILED DESCRIPTION

In a preferred embodiment, the polyoxyalkylene polyols obtainable by the process of the invention, after the total alkylene oxide metering time has elapsed, have a calculated equivalent molar mass of 9500 g·mol$^{-1}$ to 23 000 g·mol$^{-1}$, preferably of 9550 g·mol$^{-1}$ to 23 000 g·mol$^{-1}$, more preferably of 9550 g·mol$^{-1}$ to 20 000 g·mol$^{-1}$ and most preferably of 9700 to 16 000 g/mol.

It has been found in an extremely surprising manner that, prior to attainment of a calculated equivalent molar mass $M(t_2)_{equiv.}^{calc.}$ of at least 8000 g/mol, the alkylene oxide(s) can in principle be metered in as fast as desired, meaning that the alkylene oxide metering rate is subject solely to the limitation of provision of sufficient cooling performance. WO-A 2013/000915 does admittedly point out that the alkylene oxide metering rates can be altered and preferably lowered during the batch run time. However, WO-A 2013/000915 does not give any hints that only after surpassing a calculated equivalent molar mass of at least 8000 g/mol does it become absolutely necessary to lower the metering rate in order to obtain high molecular weight polyols having low viscosities, which constitutes a prerequisite for the attainment of short batch run times and hence for the achievement of an important aim of the invention.

In a particular embodiment, in a process step preceding the polymerization, the DMC catalyst can at first be separately activated by already commencing supply of a portion of the total amount of the at least one alkylene oxide to be fed in for preparation of the desired polyoxyalkylene polyol from an earlier time $t_0$ until not later than a time $t_1$. For the separate activation of the DMC catalyst, normally up to 20% by mass of alkylene oxide, preferably 2% up to 20% by mass of alkylene oxide, is used, based on the amount of the at least one H-functional starter compound used. The addition of the at least one alkylene oxide can take place before, during or after the heating of the reactor contents to reaction temperature; it preferably follows attainment of the reaction temperature. In this embodiment, the metered addition of the amount of alkylene oxide needed for the activation of the DMC catalyst commences at time $t_0$. After the metered addition of alkylene oxide has been stopped once typically 2% to 20% by mass of alkylene oxide, based on the mass of the at least one H-functional starter compound used, have been metered in, the activation of the double metal cyanide catalyst is manifested by an accelerated drop in the reactor pressure, which indicates the commencement of alkylene oxide conversion. Then, i.e. on completion of activation, the remaining amount of alkylene oxide or alkylene oxide mixture is fed into the reaction mixture.

H-functional starter compounds are those compounds containing at least one Zerewitinoff-active hydrogen atom, sometimes also referred to merely as "active hydrogen". A hydrogen bonded to C, N, O or S is referred to as Zerewitinoff-active hydrogen when it affords methane by reaction with methylmagnesium iodide, by a method discovered by Zerewitinoff. Typical examples of compounds having Zerewitinoff-active hydrogen are compounds containing carboxyl, hydroxyl or thiol groups as functional groups. The functionality is understood to mean the number of Zerewitinoff-active hydrogen atoms per molecule of the H-functional starter compounds. The at least one H-functional starter compound here usually has functionalities of 1 to 35, preferably of 2 to 8, more preferably 2 to 3, most preferably of 2. The molar masses of suitable H-functional starter compounds are generally from 18 g/mol to 1200 g/mol. If a mixture of H-functional starter compounds is used, the functionality of this mixture is the number-average functionality of the H-functional starter compounds. Typical examples of suitable starter compounds are methanol, ethanol, 1-propanol, 2-propanol and higher aliphatic monools, especially fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol, sorbitol, sucrose, hydroquinone, catechol, resorcinol, bisphenol F, bisphenol A, 1,3,5-trihydroxybenzene, and methylol-containing condensates of formaldehyde and phenol or urea. It is also possible to use high-functionality starter compounds based on hydrogenated starch hydrolysis products. These are described, for example, in EP-A 1525244. In addition, it is also possible to use ring-opening products of cyclic carboxylic anhydrides and polyols as starter compounds.

Examples are ring-opening products of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand. In addition, it is also possible to use mono- or polyfunctional carboxylic acids directly as starter compounds.

In the process of the invention, it is also possible to use pre-prepared alkylene oxide addition products of the H-functional starter compounds mentioned, i.e. polyoxyalkylene polyols preferably having OH numbers of 16 to 1000 mg KOH/g, more preferably 40 to 1000 mg KOH/g, as exclusive starters for the process of the invention, or to add them to the abovementioned starters. These alkylene oxide addition products usable as (co-)starters can in turn be prepared via DMC catalysis or base catalysis. It is also possible, in the process of the invention, to use polyester polyols preferably having OH numbers in the range from 20 to 800 mg KOH/g as (co-)starters with the aim of preparing polyoxyalkylene esters. Polyester polyols suitable for this purpose can be prepared, for example, from organic dicarboxylic acids having 2 to 12 carbon atoms and polyhydric alcohols, preferably diols, having 2 to 12 carbon atoms, preferably 2 to 6 carbon atoms, by known processes.

In addition, H-functional starter substances used as (co-)starters may be polycarbonate polyols, polyester carbonate polyols or polyoxyalkylene carbonate polyols, preferably polycarbonate diols, polyester carbonate diols or polyoxyalkylene carbonate diols, preferably each having OH numbers in the range from 20 to 800 mg KOH/g. These are prepared, for example, by reaction of phosgene, dimethyl carbonate, diethyl carbonate or diphenyl carbonate with difunctional or higher-functionality alcohols or polyester polyols or polyoxyalkylene polyols.

In the process of the invention, preferably, H-functional starter compounds having hydroxyl groups, for example methanol, ethanol, 1-propanol, 2-propanol and higher aliphatic monools, especially fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol, sorbitol, sucrose, hydroquinone, catechol, resorcinol, bisphenol F, bisphenol A, 1,3,5-trihydroxybenzene, methylol-containing condensates of formaldehyde and phenol and hydrogenated starch hydrolysis products, and pre-prepared alkylene oxide addition products of these starter compounds serve as carriers of the active hydrogens. It is also possible to use mixtures of various H-functional starter compounds. The functionality of the at least one H-functional starter compound is more preferably 2 to 3; in particular, the functionality of the at least one H-functional starter compound is preferably 2.

DMC catalysts suitable for the process of the invention are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700949, EP-A 743093, EP-A 761708, WO 97/40086, WO 98/16310 and WO 00/47649, have a very high activity in the polymerization of alkylene oxides and enable the preparation of polyoxyalkylene polyols under optimal conditions at very low catalyst concentrations (100 ppm or less), such that removal of the catalyst from the finished product is generally no longer required. A typical example is that of the highly active DMC catalysts which are described in EP-A 700949 and contain not only a double metal cyanide compound (e.g. zinc hexacyanocobaltate(III)) and an organic complex ligand (e.g. tert-butanol) but also a polyoxyalkylene compound having a number-average molecular weight greater than 500 g/mol. It is also possible to use the alkaline DMC catalysts disclosed in EP application number 10163170.3.

Cyanide-free metal salts suitable for preparation of the double metal cyanide compounds preferably have the general formula (II)

$$M(X)_n \qquad (II)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$;

M is preferably $Zn^{2+}$, $Fe^{2+}$, $Co^{2+}$ or $Ni^{2+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate, n is 1 when X=sulfate, carbonate or oxalate and n is 2 when X=halide, hydroxide, cyanate, thiocyanate, isocyanate, isothiocyanate or nitrate, or suitable cyanide-free metal salts have the general formula (III)

$$M_r(X)_3 \qquad (III)$$

where
M is selected from the metal cations $Fe^{3+}$, $Al^{3+}$ and $Cr^{3+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate,
r is 2 when X=sulfate, carbonate or oxalates and
r is 1 when X=halide, hydroxide, cyanate, thiocyanate, isocyanate, isothiocyanate, carboxylate or nitrate,
or suitable cyanide-free metal salts have the general formula (IV)

$$M(X)_s \qquad\qquad (IV)$$

where
M is selected from the metal cations $Mo^{4+}$, $V^{4+}$ and $W^{4+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate,
s is 2 when X=sulfate, carbonate or oxalate and
s is 4 when X=halide, hydroxide, cyanate, thiocyanate, isocyanate, isothiocyanate, carboxylate or nitrate,
or suitable cyanide-free metal salts have the general formula (V)

$$M(X)_t \qquad\qquad (V)$$

where
M is selected from the metal cations $Mo^{6+}$ and $W^{6+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate,
t is 3 when X=sulfate, carbonate or oxalate and
t is 6 when X=halide, hydroxide, cyanate, thiocyanate, isocyanate, isothiocyanate, carboxylate or nitrate.

Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \qquad\qquad (VI)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and
a, b and c are integers, the values for a, b and c being selected so as to assure electronic neutrality of the metal cyanide salt; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the inventive DMC catalysts are compounds of the general formula (VII)

$$M_x[M'_{x'}(CN)_y]_z \qquad\qquad (VII)$$

in which M is defined as in formulae (II) to (V) and
M' is as defined in formula (VI), and
x, x', y and z are integers and are chosen so as to give an electronically neutral double metal cyanide compound.
Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate (III).

The organic complex ligands added in the preparation of the DMC catalysts are disclosed, for example, in U.S. Pat. No. 5,158,922 (see especially column 6 lines 9 to 65), U.S. Pat. Nos. 3,404,109, 3,829,505, 3,941,849, EP-A 700949, EP-A 761708, JP-A 4145123, U.S. Pat. No. 5,470,813, EP-A 743 093 and WO-A 97/40086. For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the DMC catalysts of the invention, one or more complex-forming component(s) from the compound classes of the polyoxyalkylene compounds, polyesters, polycarbonates, polyalkylene glycol sorbitan esters, polyalkylene glycol glycidyl ethers, polyacrylamide, poly(acrylamide-co-acrylic acid), polyacrylic acid, poly (acrylic acid-co-maleic acid), polyacrylonitrile, polyalkylacrylates, polyalkylmethacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, bile acids or the salts, esters or amides thereof, cyclodextrins, phosphorus compounds, α,β-unsaturated carboxylic esters or ionic surface- or interface-active compounds are used.

Preferably, in the preparation of the DMC catalysts of the invention, in the first step, the aqueous solutions of the metal salt (e.g. zinc chloride), used in a stoichiometric excess (at least 50 mol %) based on metal cyanide salt (i.e. at least a molar ratio of cyanide-free metal salt to metal cyanide salt of 2.25:1.00), and of the metal cyanide salt (e.g. potassium hexacyanocobaltate) are converted in the presence of the organic complex ligand (e.g. tert-butanol), such that a suspension containing the double metal cyanide compound (e.g. zinc hexacyanocobaltate), water, excess cyanide-free metal salt and the organic complex ligand is formed. This organic complex ligand may be present in the aqueous solution of the cyanide-free metal salt and/or of the metal cyanide salt, or it is added directly to the suspension obtained after precipitation of the double metal cyanide compound. It has been found to be advantageous to mix the aqueous solutions of the cyanide-free metal salt and of the metal cyanide salt and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solids (i.e. the precursor of the catalyst of the invention) are isolated from the suspension by known techniques, such as centrifugation or filtration.

In a preferred execution variant for preparing the catalyst, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. Preferably, the amount of the organic complex ligand in the aqueous wash solution is between 40% and 80% by mass, based on the overall solution.

Optionally, in the third step, the aqueous wash solution is admixed with one or more further complex-forming component(s), preferably in the range between 0.5% and 5% by mass, based on the overall solution.

It is also advantageous to wash the isolated solid more than once. For this purpose, for example, the first washing procedure can be repeated. However, it is preferable to use non-aqueous solutions for further washing operations, for example a mixture of organic complex ligand and further complex-forming component.

The isolated and optionally washed solid is subsequently dried at temperatures of generally 20-100° C. and at absolute pressures of generally 0.1 mbar to atmospheric pressure (1013 mbar), optionally after pulverizing.

A preferred process for isolating the inventive DMC catalysts from the suspension by filtration, filtercake washing and drying is described in WO-A 01/80994.

In the process of the invention, the double metal cyanide catalyst is used in proportions by mass of 10 ppm to 1000 ppm, preferably in proportions by mass of 15 to 500 ppm, more preferably in proportions by mass of 20 to 300 ppm and most preferably in proportions by mass of 25 to 150 ppm, based in each case on the total mass of the reaction mixture in the reactor at time $t_3$.

Preferably, the DMC catalyst remains in the end product, but it can also be removed, for example by treatment with adsorbents. Processes for removing DMC catalysts are described, for example, in U.S. Pat. No. 4,987,271, DE-A 3132258, EP-A 406440, U.S. Pat. Nos. 5,391,722, 5,099,075, 4,721,818, 4,877,906 and EP-A 385619.

For the process of the invention, the at least one alkylene oxide has 2 to 24 carbon atoms. The alkylene oxides having 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, and 3-glycidyloxypropyltriisopropoxysilane.

In the process of the invention, the alkylene oxide used is preferably ethylene oxide, propylene oxide or a mixture of ethylene oxide and propylene oxide. If mixtures of ethylene oxide and propylene oxide are used, these preferably have up to 75% by mass of ethylene oxide, more preferably up to 50% by mass of ethylene oxide and most preferably up to 30% by mass of ethylene oxide, based on the total mass of the mixture of ethylene oxide and propylene oxide. Particular preference is given to using exclusively propylene oxide. The alkylene oxides can be supplied to the reactor as individual components or as a mixture. It is likewise possible to feed two or more alkylene oxides to the reactor in succession, by which means it is possible to implement polyoxyalkylene chains with block structure. In the metered addition of two or more alkylene oxides, it is possible to change the composition of the alkylene oxide stream supplied continuously or instantaneously.

Further monomers copolymerizable with alkylene oxides under DMC catalysis by the process of the invention are, for example, aliphatic lactones, aromatic lactones, lactides, cyclic carbonates having preferably at least three optionally substituted methylene groups between the oxygen atoms of the carbonate group, aliphatic cyclic anhydrides and aromatic cyclic anhydrides and carbon dioxide.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, and 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention, cyclic carbonates having fewer than three optionally substituted methylene groups between the oxygen atoms of the carbonate group are incorporated into the polymer chain not at all or only to a small extent.

Cyclic anhydrides are cyclic compounds containing an anhydride group in the ring. Preferred compounds are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

Their use is also described in U.S. Pat. Nos. 3,538,043, 4,500,704, 5,032,671, 6,646,100, EP-A 222453 and WO-A 2008/013731.

Figure 1:
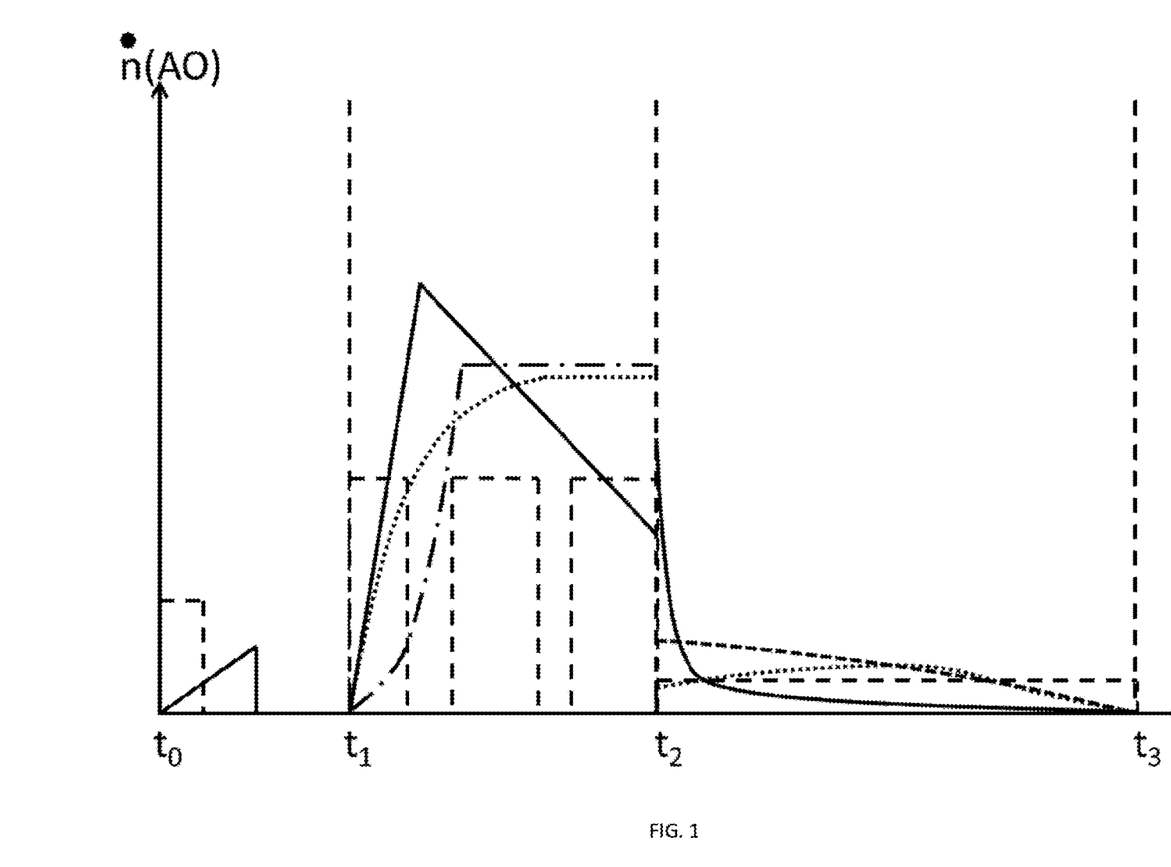
FIG. 1 illustrates the alkylene oxide metering rate profiles ṅ(AO), shown as a function of the metering time.
Figure 2:
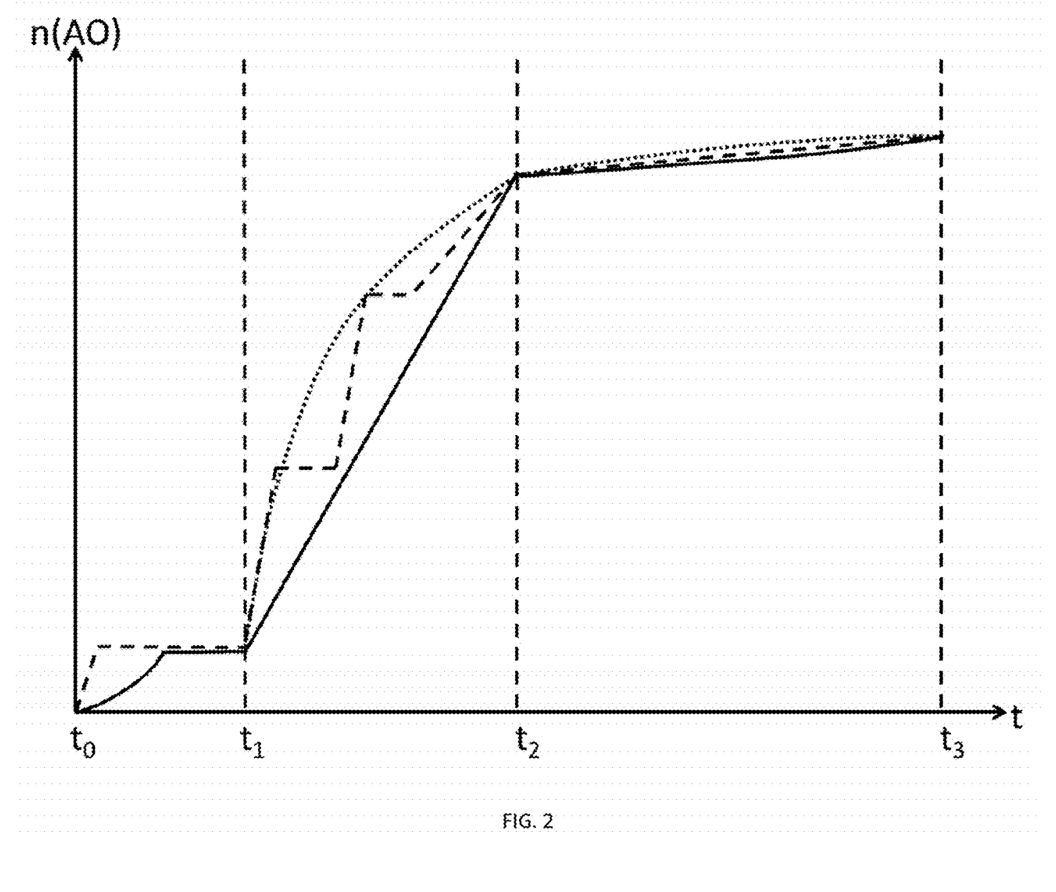
FIG. 2 illustrates the cumulated amounts of alkylene oxide metered in n(AO), shown as a function of the metering time.

In one embodiment of the process of the invention, the metering rate of the alkylene oxides or of mixtures of alkylene oxides, during the respective metering phases of the overall metered addition of alkylene oxide which lasts for <13 h, preferably ≤12 h, more preferably ≤11 h, can be altered in a linear manner as a function of the mass of alkylene oxide metered in, but this alteration may also be made in a non-linear manner. It is likewise possible to control the metered addition of alkylene oxide as a function of the metering time. During or between the metering phases with varying metering rates, time-limited intervals with a constant metering rate of the alkylene oxides or brief interruptions of metering are also possible. In addition, the aforementioned executions in respect of the metering rates can also be combined with one another, which is to be illustrated in graph form in the figures FIG. 1 and FIG. 2. In the figures, options for alkylene oxide metering rate profiles ṅ(AO) (FIG. 1) and cumulated amounts of alkylene oxide metered in n(AO) (FIG. 2) are each shown as a function of the metering time. In this context, the selection of metering profiles shown in the figures makes no claim to completeness and the metering profiles are not to scale. The figures serve merely to illustrate the process of the invention. They should in no way be interpreted as boundary cases that restrict the invention. More particularly, within the periods of time $t_0$-$t_1$, $t_1$-$t_2$ and $t_2$-$t_3$, combinations of the metering profiles shown may be employed; it is likewise of course possible to combine metering profiles from the individual periods with one another, i.e., for example, a metering profile represented in dashed form from the period $t_1$-$t_2$ with a metering profile represented in dotted form from the period $t_2$-$t_3$. It has been found to be advantageous to configure the transitions between the individual metering periods such that the epoxide metering profile is not altered in a discontinuous manner.

It is optionally possible to add aging stabilizers, for example antioxidants, to the end products.

In one embodiment, the at least one H-functional starter compound is admixed with DMC catalyst and charged into a reactor; in other words, the H-functional starter compound and the DMC catalyst are charged into a reactor. It is also additionally possible to add small amounts (1 to 500 ppm) of organic or inorganic acids to the H-functional starter compound prior to the addition of the DMC catalyst, as described, for example, in WO-A 99/14258.

In a preferred procedure, the reactor contents are first stripped with inert gas (nitrogen or a noble gas, for example argon) at temperatures of 60 to 160° C., preferably 100 to 155° C., most preferably 110 to 155° C., while stirring over a period of preferably 10 to 60 min. In the course of stripping, volatile constituents are removed with introduction of inert gases into the liquid phase with simultaneous application of reduced pressure, at an absolute pressure of 5 to 500 mbar. The temperature can subsequently be adjusted to the reaction temperature of the downstream step, provided that it is not identical to the stripping temperature. The ultimate reaction temperature can alternatively be established only in the initial phase of the alkylene oxide metering, for example with exploitation of the heat of reaction released. The reaction with the at least one alkylene oxide from the time $t_1$ is conducted at a temperature of preferably 110° C. to 150° C., more preferably at 120-150° C.

The invention thus also provides a process for preparing a polyoxyalkylene polyol having a calculated equivalent molar mass of 9500 g·mol$^{-1}$ to 23 000 g·mol$^{-1}$, preferably of 9550 g·mol$^{-1}$ to 23 000 g·mol$^{-1}$, more preferably of 9550 g·mol$^{-1}$ to 20 000 g·mol$^{-1}$ and most preferably of 9700 to 16 000 g/mol, wherein (α) the reactor is initially charged with the double metal cyanide catalyst and the at least one H-functional starter compound and, at a temperature of 60° C. to 160° C., an inert gas is introduced into the mixture of double metal cyanide catalyst and the at least one H-functional starter compound, and a reduced pressure of 5 mbar to 500 mbar (absolute) is simultaneously established by removing the inert gas ("stripping"), (β) then the at least one alkylene oxide is fed into the mixture from step (α) in the reactor ("polymerization"), and the commencement of the alkylene oxide supply in (β) marks the time $t_1$.

In a process step preceding the polymerization (see step J above), the DMC catalyst can first be activated separately by adding typically 2% to 20% by mass of alkylene oxide, based on the amount of the at least one H-functional starter compound used in step (α). The addition of the at least one alkylene oxide can take place before, during or after the heating of the reactor contents to the stripping or reaction temperature; it preferably follows the stripping. In this embodiment, the metered addition of the amount of alkylene oxide needed for the activation of the DMC catalyst commences at time $t_0$. After the metered addition of alkylene oxide has been stopped once typically 2% to 20% by mass of the at least one alkylene oxide, based on the at least one H-functional starter compound used in step (α1), have been added (step (α2)), the activation of the DMC catalyst is manifested by an accelerated drop in the reactor pressure, which indicates the commencement of alkylene oxide conversion. Then, i.e. on completion of activation, the remaining portion of the total amount of the at least one alkylene oxide to be fed in for preparation of the polyoxyalkylene polyol desired is fed into the reaction mixture, and the reaction with the at least one alkylene oxide from the time $t_1$ is conducted preferably at a temperature of 110° C. to 150° C., more preferably at 120-150° C.

The invention thus also provides a process for preparing a polyoxyalkylene polyol having a calculated equivalent molar mass of 9500 g·mol$^{-1}$ to 23 000 g·mol$^{-1}$, preferably of 9550 g·mol$^{-1}$ to 23 000 g·mol$^{-1}$, more preferably of 9550 g·mol$^{-1}$ to 20 000 g·mol$^{-1}$ and most preferably of 9700 to 16 000 g/mol, wherein (α) (α1) the reactor is initially charged with the double metal cyanide catalyst and the at least one H-functional starter compound and, at a temperature of 60° C. to 160° C., an inert gas is introduced into the mixture of double metal cyanide catalyst and the at least one H-functional starter compound, and a reduced pressure of 5 mbar to 500 mbar (absolute) is simultaneously established by removing the inert gas ("stripping"), (α2) first a portion of the total amount of the at least one alkylene oxide to be metered in is added to the mixture from step (α1) from the time $t_0$ ("activation"), (β) then the remaining amount of the at least one alkylene oxide is supplied to the reactor ("polymerization"), and the commencement of the alkylene oxide supply in (β) marks the time $t_1$.

In all the embodiments described, the reaction temperature can be varied during the polymerization (step (β)) within the temperature limits described; for example, it may be found to be advantageous to raise the reaction temperature with increasing progress of the reaction. It is likewise possible to meter the at least one alkylene oxide into the reactor in different ways. One option is metered addition into the gas phase or directly into the liquid phase, for example via an immersed tube or a distributor ring close to the reactor base in a zone with good mixing. Metered addition to the liquid phase is the preferred variant. In the case of metered addition into the liquid phase, the metering units should be designed such that they self-empty, for example through provision of metering holes on the underside of the distributor ring. The alkylene oxides are fed continuously to the reactor in such a way that the safety-related pressure limits of the reactor system used are not exceeded. Especially in the case of metered addition of ethylene oxide-containing alkylene oxide mixtures or pure ethylene oxide, it should be ensured that a sufficient partial inert gas pressure is maintained within the reactor during the startup and metering phase. This can be established, for example, by means of a noble gas (for example argon) or nitrogen.

Advantageously, it is possible by means of apparatus measures, for example the mounting of non-return valves, to prevent backflow of reaction medium into the alkylene oxide-conducting lines and metering units or into the alkylene oxide reservoir vessel.

If two or more alkylene oxides are being metered in in the polymerization step, the respective alkylene oxides can be supplied to the reactor separately or as an alkylene oxide mixture. Mixing of the alkylene oxides can be achieved, for example, by means of a mixing unit present in the common metering zone ("inline blending"). It has also been found to be useful to meter alkylene oxides, on the pump pressure side, individually or in (pre)mixed form into a pumped circulation system conducted, for example, through heat exchangers. In that case, for good mixing with the reaction medium, it is advantageous to integrate a high-shear mixing unit into the alkylene oxide/reaction medium stream. The temperature of the exothermic polymerization (alkylene oxide addition reaction) is kept at the desired level or adjusted to the desired level by cooling. According to the prior art relating to design of polymerization reactors for exothermic reactions (for example Ullmann's Encyclopedia of Industrial Chemistry, vol. B4, pp. 167 ff., 5th ed., 1992), such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers. These heat exchange surfaces should be designed such that effective cooling is possible even on commencement of the metering phase, i.e. with a low fill level. They should likewise be capable of effectively removing the possibly large amounts of heat of reaction in the phase of rapid metered addition of alkylene oxide, i.e. up to at least the time at which a calculated equivalent molar mass of 8000 g/mol is surpassed, with possibly high viscosity of the reacting reactor contents.

Generally, good mixing of the reactor contents should be ensured in all reaction phases through design and use of standard stirring units, suitable stirring units here being especially stirrers arranged over one or more levels or stirrer types which act over the full fill height (see, for example, Handbuch Apparate [Apparatus Handbook]; Vulkan-Verlag Essen, 1st ed. (1990), p. 188-208). Of particular technical relevance here is a specific mixing power which is introduced on average over the entire reactor contents and is generally in the range from 0.2 to 5 W/L, with correspondingly higher local power inputs in the region of the stirrer units themselves and possibly in the case of relatively low fill levels. In order to achieve optimal stirring action, combinations of baffles (for example flat or tubular baffles) and cooling coils (or cooling cartridges) may be arranged within the reactor according to the general prior art, and these may also extend over the vessel base. The stirring power of the mixing unit may also be varied as a function of the fill level during the metering phase, in order to ensure a particularly high specific mixing power input in critical reaction phases. For example, it may be advantageous to particularly vigorously mix solids-containing dispersions which may be present at the start of the reaction, for example, in the case of use of sucrose. Moreover, particularly when solid H-functional starter compounds are used, it should be ensured through the selection of the stirrer unit that sufficient dispersion of the solids in the reaction mixture is assured. Preference is given here to using stirrer levels passing close to the bottom, and stirrer units particularly suitable for suspension. In addition, the stirrer geometry should contribute to reducing the foaming of reaction products. The foaming of reaction mixtures can be observed, for example, after the end of the metering and post-reaction phase, when residual alkylene oxides are additionally removed under reduced pressure, at absolute pressures in the range from 1 to 500 mbar. For such cases, suitable stirrer units have been found to be those which achieve continuous mixing of the liquid surface. According to the requirement, the stirrer shaft has a base bearing and optionally further support bearings in the vessel. The stirrer shaft can be driven from the top or bottom (with central or eccentric arrangement of the shaft).

Alternatively, it is also possible to achieve the necessary mixing exclusively via a heat exchanger conducted pumped circulation system, or to operate this pumped circulation system as a further mixing component in addition to the stirrer unit, in which case the reactor contents are pumped in circulation as required (typically 1 to 50 times per hour). The specific mixing output introduced by means of pumped circulation, for example by means of an external heat exchanger or, in the case of recycling into the reactor, by means of a nozzle or injector, likewise amounts to values averaging from 0.2 to 5 W/L, this being based on the liquid volume present in the reactor and the pumped circulation system at the end of the reaction phase.

It has been found to be advantageous for the performance of the process of the invention to choose a specific mixing power input between 2 and 5 W/L, or, if appropriate, to aim for this higher range toward the end of the batch run time.

A wide variety of different reactor types is suitable for the performance of the process of the invention. Preference is given to using cylindrical vessels having a height/diameter ratio of 1:1 to 10:1. Useful reactor bases include hemispherical, dished, flat or conical bases, for example.

The end of the metered addition of alkylene oxide or a change in the composition of the alkylene oxide mixture metered in may be followed by postreaction phases in which the decrease in the concentration of unreacted alkylene oxide can be quantified by monitoring the pressure. It is optionally possible to completely free the reaction mixture, after the last postreaction phase has ended, of small amounts of unconverted alkylene oxides under reduced pressure, for example at an absolute pressure of 1 to 500 mbar, or by stripping. Stripping removes volatile constituents, for example (residual) alkylene oxides, with introduction of inert gases and/or steam into the liquid phase with simultaneous application of reduced pressure (for example by passing inert gas through at an absolute pressure of 5 to 500 mbar). The removal of volatile constituents, for example of unconverted alkylene oxides, either under reduced pressure or by stripping, is generally effected at temperatures of 20 to 200° C., preferably at 50 to 160° C., and preferably at reaction temperature with stirring. Such stripping operations can also be performed in what are called stripping columns, in which an inert gas or steam stream is passed counter to the product stream. Preference is given to using stripping columns having random packings or internals for this purpose. Such stripping operations can also be conducted continuously by, for example, collecting the unstripped material in a buffer vessel and feeding it continuously to the stripping column therefrom. On attainment of constant pressure in the postreaction phase and optionally after removing volatile constituents by means of reduced pressure and/or stripping, the product can be discharged from the reactor.

It is optionally possible to add ageing stabilizers, for example antioxidants, to the polyoxyalkylene polyols prepared by the process of the invention.

The polyoxyalkylene polyols prepared by the process of the invention can be reacted with organic polyisocyanates alone or optionally in a mixture with further isocyanate-reactive components, optionally in the presence of blowing agents, optionally in the presence of catalysts and optionally together with further additives, for example cell stabilizers, and as such serve as components of solid or foamed polyurethanes, for example flexible polyurethane foam, for example slabstock flexible polyurethane foam and molded flexible polyurethane foam. The polyoxyalkylene polyols prepared by the process of the invention can especially also be used as components for adhesive and sealant materials. For example, they can serve as precursor polyols for the preparation of silane-terminated polyoxyalkylenes which can in turn find use in moisture-curing sealant systems.

The invention likewise provides polyurethanes, preferably solid or foamed polyurethanes, especially flexible polyurethane foams, for example slabstock flexible polyurethane foams and molded flexible polyurethane foams, or adhesive and sealant materials, comprising the polyoxyalkylene polyols prepared by the process of the invention.

EXAMPLES

The OH numbers were determined by the method of DIN 53240. The viscosities were determined by means of a rotary viscometer (Physica MCR 51, manufacturer: Anton Paar) by the method of DIN 53018.

Raw Materials Used
Catalyst for the Alkylene Oxide Addition (DMC Catalyst):
double metal cyanide catalyst, containing zinc hexacyanocobaltate, tert-butanol and polypropylene glycol having a number-average molecular weight of 1000 g/mol; described in WO-A 01/80994, example 6.
ACCLAIM® Polyol 2200N:
polypropylene glycol having a molar mass of 2000 g/mol, prepared via DMC catalysis (30 ppm of DMC catalyst), obtainable from Covestro AG.
IRGANOX® 1076:
octadecyl 3-(3,5-di-tert-butyl-4-hydroxyphenyl)propionate (BASF SE)
Process Parameters:
The stirrer speeds of 320 rpm and 350 rpm set in the experiments respectively corresponded to specific power inputs of about 2.4 W/L and about 3 W/L (gate stirrer) based on the reactor volume.

Example 1

A 10 L laboratory autoclave was charged with 609.8 g of ACCLAIM® Polyol 2200N under a nitrogen atmosphere. After addition of 0.420 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.6 g of propylene oxide were metered into the headspace of the autoclave within 12.08 hours. The calculated equivalent molar mass was 9859 g/mol and the calculated target OHN ($OHN_{target}$) was 5.69 mg KOH/g.

The propylene oxide (PO) was fed into the autoclave using the following metering and temperature profile:
- 0 to 25 g of PO: There was a linear increase in the metering rate from 78 g/h to 117 g/h as a function of the mass of PO metered in, reaction temperature: 123° C.,
- 25 to 207.2 g of PO: There was a linear increase in the metering rate from 117 g/h to 816 g/h and a linear increase in the reaction temperature from 123° C. to 130° C. as a function of the mass of PO metered in,
- 207.2 to 2784.2 g of PO: The metering rate remained constant at 816 g/h, reaction temperature: 130° C.,
- 2784.2 to 4316.5 g of PO: There was a linear decrease in the metering rate from 816 g/h to 259 g/h as a function of the mass of PO metered in, reaction temperature: 130° C.,
- 4316.5 to 5390.6 g of PO: There was a linear decrease in the metering rate from 259 g of PO per hour to 183 g of PO per hour as a function of the mass of PO metered in. With 4316.5 g of PO metered in, a theoretical equivalent molar mass of 8092 g/mol had been attained. In this last metering phase, PO was metered in at an average of 221 g/h, corresponding to 35.6 mol PO/(mol OH×h)×(mg KOH/g). The reaction temperature was 130° C.

A postreaction time of 20 min was followed by devolatilization at 130° C. and at an absolute pressure of 1 mbar for 0.5 h, then cooling to 80° C., and 2.413 g of IRGANOX® 1076 were added. The physical properties and further analytical data are reported in table 1.

Example 2

A 10 L laboratory autoclave was charged with 609.7 g of ACCLAIM® Polyol 2200N under a nitrogen atmosphere. After addition of 0.424 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.6 g of propylene oxide were metered into the headspace of the autoclave within 12.08 hours. The calculated equivalent molar mass was 9859 g/mol and the calculated target OHN ($OHN_{target}$) was 5.69 mg KOH/g.

The PO was fed into the autoclave using the following metering and temperature profile:
- 0 to 25.9 g of PO: There was a linear increase in the metering rate from 78 g/h to 117 g/h as a function of the mass of PO metered in, reaction temperature: 123° C.,
- 25.9 to 207.2 g of PO: There was a linear increase in the metering rate from 117 g/h to 816 g/h and a linear increase in the reaction temperature from 123° C. to 130° C. as a function of the mass of PO metered in,
- 207.2 to 2784.2 g of PO: The metering rate remained constant at 816 g/h, reaction temperature: 130° C.,
- 2784.2 to 4316.5 g of PO: There was a linear decrease in the metering rate from 816 g/h to 259 g/h and a linear decrease in the reaction temperature from 130° C. to 123° C. as a function of the mass of PO metered in,
- 4316.5 to 5390.6 g of PO: There was a linear decrease in the metering rate from 259 g of PO per hour to 183 g of PO per hour as a function of the mass of PO metered in. With 4316.5 g of PO metered in, a theoretical equivalent molar mass of 8094 g/mol had been attained. In this last metering phase, PO was metered in at an average of 221 g/h, corresponding to 35.6 mol PO/(mol OH×h)×(mg KOH/g). The reaction temperature was 123° C.

A postreaction time of 20 min was followed by devolatilization at 130° C. and at an absolute pressure of 1 mbar for 0.5 h, then cooling to 80° C., and 2.422 g of IRGANOX® 1076 were added. The physical properties and further analytical data are reported in table 1.

Example 3

A 10 L laboratory autoclave was charged with 609.6 g of ACCLAIM® Polyol 2200N under a nitrogen atmosphere. After addition of 0.427 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.6 g of propylene oxide were metered into the headspace of the autoclave within 10.68 hours. The calculated equivalent molar mass was 9859 g/mol and the calculated target OHN ($OHN_{target}$) was 5.69 mg KOH/g.

The PO was fed into the autoclave using the following metering and temperature profile:
- 0 to 25.9 g of PO: There was a linear increase in the metering rate from 78 g/h to 117 g/h as a function of the mass of PO metered in, reaction temperature: 123° C.,
- 25.9 to 207.2 g of PO: There was a linear increase in the metering rate from 117 g/h to 816 g/h and a linear increase in the reaction temperature from 123° C. to 130° C. as a function of the mass of PO metered in,
- 207.2 to 2784.2 g of PO: The metering rate remained constant at 816 g/h, reaction temperature: 130° C.,
- 2784.2 to 4866.5 g of PO: There was a linear decrease in the metering rate from 816 g/h to 259 g/h as a function of the mass of PO metered in, reaction temperature: 130° C.,
- 4866.5 to 5390.6 g of PO: There was a linear decrease in the metering rate from 259 g of PO per hour to 183 g of PO per hour as a function of the mass of PO metered in. With 4866.5 g of PO metered in, a theoretical equivalent molar mass of 8999 g/mol had been attained. In this last metering phase, PO was metered in at an average of 221 g/h, corresponding to 35.6 mol PO/(mol OH×h)×(mg KOH/g). The reaction temperature was 130° C.

A postreaction time of 20 min was followed by devolatilization at 130° C. and at an absolute pressure of 1 mbar for 0.5 h, then cooling to 80° C., and 2.429 g of IRGANOX®

1076 were added. The physical properties and further analytical data are reported in table 1.

Example 4 (Comparative)

A 10 L laboratory autoclave was charged with 609.5 g of ACCLAIM® Polyol 2200N under a nitrogen atmosphere. After addition of 0.426 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.7 g of propylene oxide were metered into the headspace of the autoclave within 17.85 hours. The calculated equivalent molar mass was 9859 g/mol and the calculated target OHN ($OHN_{target}$) was 5.69 mg KOH/g.

The PO was fed into the autoclave using the following metering and temperature profile:
- 0 to 25.9 g of PO: There was a linear increase in the metering rate from 65 g/h to 97 g/h as a function of the mass of PO metered in, reaction temperature: 123° C.,
- 25.9 to 207.2 g of PO: There was a linear increase in the reaction temperature from 123° C. to 130° C. as a function of the mass of PO metered in; the PO metering rate was left at 97 g/h,
- 207.2 to 2460.4 g of PO: There was a linear increase in the metering rate from 97 g/h to 680 g/h as a function of the mass of PO metered in, reaction temperature: 130° C.,
- 2460.4 g of PO to 2783.7 g of PO: There was a linear decrease in the metering rate from 680 g/h to 356 g/h and a linear decrease in the reaction temperature from 130° C. to 123° C. as a function of the mass of PO metered in,
- 2783.7 g of PO to 5390.7 g of PO: The PO metering rate was left at 356 g/h; the reaction temperature was 123° C. With 2783.7 g of PO metered in, a theoretical equivalent molar mass of 5577 g/mol had been attained. In this last metering phase, PO was metered in at an average of 356 g/h, corresponding to 57.3 mol PO/(mol OH×h)×(mg KOH/g).

A postreaction time of 20 min was followed by devolatilization at 123° C. and at an absolute pressure of 1 mbar for 0.5 h, then cooling to 80° C., and 2.429 g of IRGANOX® 1076 were added. The physical properties and further analytical data are reported in table 1.

Example 5 (Comparative)

A 10 L laboratory autoclave was charged with 609.5 g of ACCLAIM® Polyol 2200N under a nitrogen atmosphere. After addition of 0.422 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.7 g of propylene oxide were metered into the headspace of the autoclave within 13.31 hours. The calculated equivalent molar mass was 9859 g/mol and the calculated target OHN ($OHN_{target}$) was 5.69 mg KOH/g.

The PO was fed into the autoclave using the following metering and temperature profile:
- 0 to 25.9 g of PO: There was a linear increase in the metering rate from 65 g/h to 97 g/h as a function of the mass of PO metered in, reaction temperature: 123° C.,
- 25.9 to 207.2 g of PO: There was a linear increase in the reaction temperature from 123° C. to 130° C. as a function of the mass of PO metered in; the PO metering rate was raised in a linear manner from 97 g/h to 194 g/h,
- 207.2 to 798.6 g of PO: There was a linear increase in the metering rate from 194 g/h to 432 g/h as a function of the mass of PO metered in, reaction temperature: 130° C.,
- 798.6 g of PO to 2460.4 g of PO: There was a linear increase in the metering rate from 432 g/h to 680 g/h as a function of the mass of PO metered in, reaction temperature: 130° C.,
- 2460.4 g of PO to 2784.2 g of PO: The PO metering rate was left at 680 g/h; reaction temperature: 130° C.,
- 2784.2 g of PO to 4316.5 g of PO: There was a linear decrease in the metering rate from 680 g/h to 356 g/h and the reaction temperature was lowered in a linear manner from 130° C. to 123° C. as a function of the mass of PO metered in,
- 4316.5 g of PO to 5390.7 g of PO: The PO metering rate was left at 356 g/h; reaction temperature: 123° C. With 4316.5 g of PO metered in, a theoretical equivalent molar mass of 8096 g/mol had been attained. In this last metering phase, PO was metered in at an average of 356 g/h, corresponding to 57.3 mol PO/(mol OH×h)×(mg KOH/g).

A postreaction time of 84 min was followed by devolatilization at 123° C. and at an absolute pressure of 1 mbar for 0.5 h, then cooling to 80° C., and 2.405 g of IRGANOX® 1076 were added. The physical properties and further analytical data are reported in table 1.

Example 6 (Comparative)

A 10 L laboratory autoclave was charged with 609.5 g of ACCLAIM® Polyol 2200N under a nitrogen atmosphere. After addition of 0.426 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.8 g of propylene oxide were metered into the headspace of the autoclave within 11.07 hours. The calculated equivalent molar mass was 9859 g/mol and the calculated target OHN ($OHN_{target}$) was 5.69 mg KOH/g.

The PO was fed into the autoclave using the following metering and temperature profile:
- 0 to 25.9 g of PO: There was a linear increase in the metering rate from 78 g/h to 117 g/h as a function of the mass of PO metered in, reaction temperature: 123° C.,
- 25.9 to 207.2 g of PO: There was a linear increase in the reaction temperature from 123° C. to 130° C. as a function of the mass of PO metered in; the PO metering rate was raised in a linear manner from 117 g/h to 233 g/h,
- 207.2 to 798.6 g of PO: There was a linear increase in the metering rate from 233 g/h to 518 g/h as a function of the mass of PO metered in, reaction temperature: 130° C., 798.6 g of PO to 2460.4 g of PO: There was a linear increase in the metering rate from 518 g/h to 816 g/h as a function of the mass of PO metered in, reaction temperature: 130° C., 2460.4 g of PO to 2784.2 g of PO: The PO metering rate was left at 816 g/h; reaction temperature: 130° C., 2784.2 g of PO to 4316.5 g of PO: There was a linear decrease in the metering rate from 816 g/h to 427 g/h and the reaction temperature was lowered in a linear manner from 130° C. to 123° C. as a function of the mass of PO metered in, 4316.5 g of PO to 5390.8 g of PO: The PO metering rate was left at 427 g/h; reaction temperature: 123° C. With 4316.5 g of PO metered in, a theoretical equivalent molar mass of 8096 g/mol had been attained. In this last metering phase, PO was metered in at an average of 427 g/h, corresponding to 68.8 mol PO/(mol OH×h)×(mg KOH/g).

A postreaction time of 30 min was followed by devolatilization at 123° C. and at an absolute pressure of 1 mbar for 0.5 h, then cooling to 80° C., and 2.429 g of IRGANOX® 1076 were added. The physical properties and further analytical data are reported in table 1.

TABLE 1

| Example (total alkylene oxide metering time in h) | For the last PO metering phase: $\frac{n_{PO}}{n_{OH} \times \Delta t} \times \text{OHN}_{target}$ [mol PO/(mol OH × h) × (mg KOH/g)] | OH number measured [mg KOH/g] | Viscosity at 25° C. [mPas] |
|---|---|---|---|
| 1 (12.08) | 35.6 | 6.0 | 22600 |
| 2 (12.08) | 35.6 | 5.9 | 23100 |
| 3 (10.68) | 35.6 | 6.0 | 22300 |
| 4, comparative (17.85) | 57.3 | 6.0 | 24250 |
| 5, comparative (13.31) | 57.3 | 6.0 | 24050 |
| 6, comparative (11.07) | 68.8 | 6.0 | 26300 |

Example 7 (Comparative)

A 10 L laboratory autoclave was charged with 471.9 g of ACCLAIM® Polyol 2200N under a nitrogen atmosphere. After addition of 0.483 g of DMC catalyst, the contents of the autoclave were stripped at 130° C. while stirring (gate stirrer) at 350 rpm under reduced pressure at an absolute pressure of 100 to 120 mbar with introduction of 50 mL of nitrogen per minute via a distributor ring beneath the liquid level for 30 min. By means of this distributor ring, a total of 5528.6 g of propylene oxide were then metered in, likewise initially at 130° C. with stirring at 350 rpm, at a constant metering rate of 392 g/h, corresponding to 63.0 mol PO/(mol OH×h)×(mg KOH/g), and a stirrer speed of 350 rpm. This gave a total metering time for the propylene oxide of 14.1 h. After metering in 50 g of propylene oxide, the reaction temperature was raised to 145° C. within 7 min and kept at this temperature until the end of the propylene oxide metering. A postreaction time of 15 min was followed by devolatilization at 145° C. and at an absolute pressure of 1 mbar for 0.5 h, then cooling to 80° C. and addition of 3.0 g of IRGANOX® 1076. The calculated equivalent molar mass was 12 740 g/mol and the calculated target OHN (OHN$_{target}$) was 4.4 mg KOH/g. The physical properties and further analytical data are reported in table 2.

Example 8 (Comparative)

A 10 L laboratory autoclave was charged with 471.5 g of ACCLAIM® Polyol 2200N under a nitrogen atmosphere. After addition of 0.479 g of DMC catalyst, the contents of the autoclave were stripped at 130° C. while stirring (gate stirrer) at 350 rpm under reduced pressure at an absolute pressure of 100 to 120 mbar with introduction of 50 mL of nitrogen per minute via a distributor ring beneath the liquid level for 30 min. By means of this distributor ring, a total of 5528.7 g of propylene oxide were then metered in, at first likewise at 130° C. with stirring at 350 rpm, at a stirrer speed of 350 rpm. This gave a total metering time for the propylene oxide of 18.3 h. After metering in 45 g of propylene oxide, the reaction temperature was raised to 145° ° C. within 7 min and kept at this temperature until the end of the propylene oxide metering. The calculated equivalent molar mass was 12748 g/mol and the calculated target OHN (OHN$_{target}$) was 4.4 mg KOH/g.

The PO was fed into the autoclave using the following metering profile:

0 to 2462 g of PO: The PO was fed in at a constant metering rate of 352 g/h, 2462 to 4028 g of PO: There was a linear decrease in the metering rate from 352 g/h to 315 g/h as a function of the mass of PO metered in, 4028 to 5200 g of PO: There was a linear decrease in the metering rate from 315 g/h to 220 g/h as a function of the mass of PO metered in, 5200 to 5500 g of PO: There was a linear decrease in the metering rate from 220 g/h to 130 g/h as a function of the mass of PO metered in, 5500 to 5528 g of PO: There was a linear decrease in the metering rate from 130 g of PO per hour to 100 g of PO per hour as a function of the mass of PO metered in. With 3338.4 g of PO metered in, a theoretical equivalent molar mass of 8096 g/mol had been attained. In the remainder of this and the subsequent metering phases, PO was metered in at an average of 270.4 g/h, corresponding to 43.5 mol PO/(mol OH×h)×(mg KOH/g).

A postreaction time of 20 min was followed by devolatilization at 145° C. and at an absolute pressure of 1 mbar for 0.5 h, then cooling to 80° C., and 3.010 g of IRGANOX® 1076 were added. The physical properties and further analytical data are reported in table 2.

Example 9

A 10 L laboratory autoclave was charged with 471.4 g of ACCLAIM® Polyol 2200N under a nitrogen atmosphere. After addition of 0.485 g of DMC catalyst, the contents of the autoclave were stripped at 130° C. while stirring (gate stirrer) at 350 rpm under reduced pressure at an absolute pressure of 100 to 120 mbar with introduction of 50 mL of nitrogen per minute via a distributor ring beneath the liquid level for 30 min. By means of this distributor ring, a total of 5528.7 g of propylene oxide were then metered in, at first likewise at 130° C. with stirring at 350 rpm, at a stirrer speed of 350 rpm. This gave a total metering time for the propylene oxide of 12.8 h. After metering in 20 g of propylene oxide, the reaction temperature was raised to 145° C. within 7 min and kept at this temperature until the end of the propylene oxide metering. The calculated equivalent molar mass was 12750 g/mol and the calculated target OHN (OHN$_{target}$) was 4.4 mg KOH/g.

The PO was fed into the autoclave using the following metering profile:
- 0 to 30 g of PO: There was a linear increase in the metering rate from 100 g/h to 200 g/h as a function of the mass of PO metered in,
- 30 to 100 g of PO: There was a linear increase in the metering rate from 200 g/h to 1700 g/h as a function of the mass of PO metered in,
- 100 to 3000 g of PO: PO was fed in at a constant metering rate of 1700 g/h,
- 3000 to 3338.4 g of PO: There was a linear decrease in the metering rate from 1700 g/h to 230 g/h as a function of the mass of PO metered in,
- 3338.4 to 5528.7 g of PO: There was a linear decrease in the metering rate from 230 g of PO per hour to 200 g of PO per hour as a function of the mass of PO metered in. With 3338.4 g of PO metered in, a theoretical equivalent molar mass of 8096 g/mol had been attained. In this last metering phase, PO was metered in at an average of 215 g/h, corresponding to 34.6 mol PO/(mol OH×h)×(mg KOH/g).

A postreaction time of 20 min was followed by devolatilization at 145° C. and at an absolute pressure of 1 mbar for 0.5 h, then cooling to 80° C., and 3.005 g of IRGANOX® 1076 were added. The physical properties and further analytical data are reported in table 2.

Example 10 (Comparative)

A 10 L laboratory autoclave was charged with 471.5 g of ACCLAIM® Polyol 2200N under a nitrogen atmosphere. After addition of 0.485 g of DMC catalyst, the contents of the autoclave were stripped at 130° C. while stirring (gate stirrer) at 350 rpm under reduced pressure at an absolute pressure of 100 to 120 mbar with introduction of 50 mL of nitrogen per minute via a distributor ring beneath the liquid level for 30 min. By means of this distributor ring, a total of 5528.8 g of propylene oxide were then metered in, at first likewise at 130° C. with stirring at 350 rpm, at a stirrer speed of 350 rpm. This gave a total metering time for the propylene oxide of 12.9 h. After metering in 23 g of propylene oxide, the reaction temperature was raised to 145° C. within 6 min and kept at this temperature until the end of the propylene oxide metering. The calculated equivalent molar mass was 12749 g/mol and the calculated target OHN (OHN$_{target}$) was 4.4 mg KOH/g.

The PO was fed into the autoclave using the following metering profile:
- 0 to 30 g of PO: There was a linear increase in the metering rate from 100 g/h to 200 g/h as a function of the mass of PO metered in,
- 30 to 100 g of PO: There was a linear increase in the metering rate from 200 g/h to 500 g/h as a function of the mass of PO metered in,
- 100 to 3000 g of PO: PO was fed in at a constant metering rate of 500 g/h,
- 3000 to 3338.4 g of PO: There was a linear decrease in the metering rate from 500 g/h to 390 g/h as a function of the mass of PO metered in,
- 3338.4 to 5528.8 g of PO: There was a linear decrease in the metering rate from 390 g of PO per hour to 360 g of PO per hour as a function of the mass of PO metered in. With 3338.4 g of PO metered in, a theoretical equivalent molar mass of 8095 g/mol had been attained. In this last metering phase, PO was metered in at an average of 375 g/h, corresponding to 60.4 mol PO/(mol OH×h)×(mg KOH/g).

A postreaction time of 20 min was followed by devolatilization at 145° C. and at an absolute pressure of 1 mbar for 0.5 h, then cooling to 80° C., and 3.010 g of IRGANOX® 1076 were added. The physical properties and further analytical data are reported in table 2.

TABLE 2

| Example (total alkylene oxide metering time in h) | For the last PO metering phase(s): $\frac{n_{PO}}{n_{OH} \times \Delta t} \times OHN_{target}$ [mol PO/(mol OH × h) × (mg KOH/g)] | OH number measured [mg KOH/g] | Viscosity at 25° C. [mPas] |
|---|---|---|---|
| 7, comparative (14.1) | 63.0 | 5.0 | 39000 |
| 8, comparative (18.3) | 43.5 | 4.9 | 39950 |
| 9 (12.8) | 34.6 | 4.9 | 36000 |
| 10, comparative (12.9) | 60.4 | 4.9 | 41200 |

Example 11

A 10 L laboratory autoclave was charged with 609.5 g of ACCLAIM® Polyol 2200 N under a nitrogen atmosphere. After addition of 0.422 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5289.5 g of a mixture of 91.7% by mass of PO and 8.3% by mass of ethylene oxide (EO) were metered into the headspace of the autoclave within 10.73 hours. The calculated equivalent molar mass was 9696 g/mol and the calculated target OHN (OHN$_{target}$) was 5.79 mg KOH/g.

The composition of the alkylene oxide mixture was kept constant at 91.7% by mass of PO and 8.3% by mass of EO over all the metering phases. It was fed into the autoclave using the following metering and temperature profile:
- 0 to 25.4 g of alkylene oxide mixture: There was a linear increase in the metering rate from 76.5 g/h to 114.5 g/h as a function of the mass of alkylene oxide mixture metered in, reaction temperature: 123° C.,
- 25.4 to 203.3 g of alkylene oxide mixture: There was a linear increase in the metering rate from 114.5 g/h to 800.7 g/h and a linear increase in the reaction temperature from 123° C. to 130° C. as a function of the mass of alkylene oxide mixture metered in,
- 203.3 to 2732.0 g of alkylene oxide mixture: The metering rate remained constant at 800.7 g/h, reaction temperature: 130° C.,
- 2732.0 to 4775.2 g of alkylene oxide mixture: There was a linear decrease in the metering rate from 800.7 g/h to 254.1 g/h as a function of the mass of alkylene oxide mixture metered in, reaction temperature: 130° C.,
- 4775.2 to 5289.5 g of alkylene oxide mixture: There was a linear decrease in the metering rate from 254.1 g of alkylene oxide mixture per hour to 179.6 g of alkylene oxide mixture per hour as a function of the mass of alkylene oxide mixture metered in. With 4775.2 g of alkylene oxide mixture metered in, a theoretical equivalent molar mass of 8850 g/mol had been attained. In this last metering phase, alkylene oxide mixture was metered in at an average of 217 g/h, corresponding to 36.5 mol alkylene oxide mixture/(mol OH×h)×(mg KOH/g). The reaction temperature was 130° C.

A postreaction time of 20 min was followed by devolatilization at 130° C. and at an absolute pressure of 1 mbar for 0.5 h, then cooling to 80° C., and 2.429 g of IRGANOX® 1076 were added. The physical properties and further analytical data are reported in table 3.

Example 12

A 10 L laboratory autoclave was charged with 609.5 g of ACCLAIM® Polyol 2200 N under a nitrogen atmosphere. After addition of 0.424 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.1 g of a mixture of 70.0% by mass of PO and 30.0% by mass of EO were metered into the headspace of the autoclave within 10.73 hours. The calculated equivalent molar mass was 9859 g/mol and the calculated target OHN ($OHN_{target}$) was 5.69 mg KOH/g.

The composition of the alkylene oxide mixture was kept constant at 70.0% by mass of PO and 30.0% by mass of EO over all the metering phases. It was fed into the autoclave using the following metering and temperature profile:
  0 to 25.9 g of alkylene oxide mixture: There was a linear increase in the metering rate from 78.0 g/h to 117.0 g/h as a function of the mass of alkylene oxide mixture metered in, reaction temperature: 123° C.,
  25.9 to 207.1 g of alkylene oxide mixture: There was a linear increase in the metering rate from 117.0 g/h to 815.7 g/h and a linear increase in the reaction temperature from 123° C. to 130° C. as a function of the mass of alkylene oxide mixture metered in,
  207.1 to 2782.9 g of alkylene oxide mixture: The metering rate remained constant at 815.7 g/h, reaction temperature: 130° C.,
  2782.9 to 4865.7 g of alkylene oxide mixture: There was a linear decrease in the metering rate from 815.7 g/h to 259.0 g/h as a function of the mass of alkylene oxide mixture metered in, reaction temperature: 130° C.,
  4865.7 to 5390.1 g of alkylene oxide mixture: There was a linear decrease in the metering rate from 259.0 g of alkylene oxide mixture per hour to 183.0 g of alkylene oxide mixture per hour as a function of the mass of alkylene oxide mixture metered in. With 4865.7 g of alkylene oxide mixture metered in, a theoretical equivalent molar mass of 8999 g/mol had been attained. In this last metering phase, alkylene oxide mixture was metered in at an average of 221 g/h, corresponding to 39.0 mol alkylene oxide mixture/(mol OH×h)×(mg KOH/g). The reaction temperature was 130° C.

A postreaction time of 20 min was followed by devolatilization at 130° C. and at an absolute pressure of 1 mbar for 0.5 h, then cooling to 80° C., and 2.406 g of IRGANOX® 1076 were added. The physical properties and further analytical data are reported in table 3.

Example 13 (Comparative)

A 10 L laboratory autoclave was charged with 609.6 g of ACCLAIM® Polyol 2200 N under a nitrogen atmosphere. After addition of 0.423 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5389.6 g of a mixture of 90.0% by mass of PO and 10.0% by mass of EO were metered into the headspace of the autoclave within 11.08 hours. The calculated equivalent molar mass was 9859 g/mol and the calculated target OHN ($OHN_{target}$) was 5.69 mg KOH/g.

The composition of the alkylene oxide mixture was kept constant at 90.0% by mass of PO and 10.0% by mass of EO over all the metering phases. It was fed into the autoclave using the following metering and temperature profile:
  0 to 25.9 g of alkylene oxide mixture: There was a linear increase in the metering rate from 78.0 g/h to 117.0 g/h as a function of the mass of alkylene oxide mixture metered in, reaction temperature: 123° C.,
  25.9 to 207.2 g of alkylene oxide mixture: There was a linear increase in the metering rate from 117.0 g/h to 233.0 g/h and a linear increase in the reaction temperature from 123° C. to 130° C. as a function of the mass of alkylene oxide mixture metered in,
  207.2 to 798.6 g of alkylene oxide mixture: There was a linear increase in the metering rate from 233.0 g/h to 518.0 g/h as a function of the mass of alkylene oxide mixture metered in, reaction temperature: 130° C.,
  798.6 to 2640.4 g of alkylene oxide mixture: There was a linear increase in the metering rate from 518.0 g/h to 816.0 g/h as a function of the mass of alkylene oxide mixture metered in, reaction temperature: 130° C.,
  2640.4 to 2784.2 g of alkylene oxide mixture: The metering rate remained constant at 816.0 g/h, reaction temperature: 130° C.,
  2784.2 to 4316.6 g of alkylene oxide mixture: There was a linear decrease in the metering rate from 816.0 g/h to 427.0 g/h and a linear decrease in the reaction temperature from 130° C. to 123° C. as a function of the mass of alkylene oxide mixture metered in,
  4316.6 to 5389.6 g of alkylene oxide mixture: The alkylene oxide mixture metering rate was left at 427.0 g/h and the reaction temperature was left at 123° C. With 4316.6 g of alkylene oxide mixture metered in, a theoretical equivalent molar mass of 8095 g/mol had been attained. In this last metering phase, alkylene oxide mixture was metered in at an average of 427.0 g/h, corresponding to 70.9 mol alkylene oxide mixture/(mol OH×h)×(mg KOH/g).

A postreaction time of 60 min was followed by devolatilization at 123° C. and at an absolute pressure of 1 mbar for 0.5 h, then cooling to 80° C., and 2.421 g of IRGANOX® 1076 were added. The physical properties and further analytical data are reported in table 3.

Example 14 (Comparative)

A 10 L laboratory autoclave was charged with 609.5 g of ACCLAIM® Polyol 2200 N under a nitrogen atmosphere. After addition of 0.425 g of DMC catalyst, the contents of the autoclave were stripped at 123° C. while stirring (gate stirrer) at 320 rpm under reduced pressure at an absolute pressure of 100 to 120 mbar with introduction of 50 mL of nitrogen per minute via a distributor ring beneath the liquid level for 30 min. Then, likewise initially at 123° C. and with stirring at 320 rpm, a total of 5390.2 g of a mixture of 70.0% by mass of PO and 30.0% by mass of EO were metered into the headspace of the autoclave within 10.66 hours. The oxide mixture was metered in at an average of 427.0 g/h, corresponding to 75.3 mol alkylene oxide mixture/(mol OH×h)×(mg KOH/g).

A postreaction time of 60 min was followed by devolatilization at 123° C. and at an absolute pressure of 1 mbar for 0.5 h, then cooling to 80° C., and 2.421 g of IRGANOX® 1076 were added. The physical properties and further analytical data are reported in table 3.

TABLE 3

| Example (total alkylene oxide metering time in h) | For the last alkylene oxide mixture metering phase: $\frac{n_{AO}}{n_{OH} \times \Delta t} \times OHN_{target}$ [mol AO*/(mol OH × h) × (mg KOH/g)] | Alkylene oxide mixture composition (PO/EO as weight ratio [% by mass/% by mass]) | OH number measured [mg KOH/g] | Viscosity at 25° C. [mPas]** |
|---|---|---|---|---|
| 11 (10.7) | 36.5 | 91.7/8.3 | 6.1 | 23650 |
| 12 (10.7) | 39.0 | 70/30 | 6.0 | 36050 |
| 13, comparative (11.1) | 70.9 | 90/10 | 6.0 | 27050 |
| 14, comparative (10.7) | 75.3 | 70/30 | 6.4 | 39700 |

*AO = alkylene oxide mixture

**In the case of polyoxyalkylene polyols having such high equivalent molar masses, there is an increase in the viscosity with growing oxyethylene group content owing to the increase in the contour length of the polyether chains.

calculated equivalent molar mass was 9859 g/mol and the calculated target OHN ($OHN_{target}$) was 5.69 mg KOH/g.

The composition of the alkylene oxide mixture was kept constant at 70.0% by mass of PO and 30.0% by mass of EO over all the metering phases. It was fed into the autoclave using the following metering and temperature profile:
- 0 to 25.9 g of alkylene oxide mixture: There was a linear increase in the metering rate from 78.0 g/h to 117.0 g/h as a function of the mass of alkylene oxide mixture metered in, reaction temperature: 123° C.,
- 25.9 to 207.1 g of alkylene oxide mixture: There was a linear increase in the metering rate from 117.0 g/h to 232.9 g/h and a linear increase in the reaction temperature from 123° C. to 130° C. as a function of the mass of alkylene oxide mixture metered in,
- 207.1 to 798.6 g of alkylene oxide mixture: There was a linear increase in the metering rate from 232.9 g/h to 518.0 g/h as a function of the mass of alkylene oxide mixture metered in, reaction temperature: 130° C.,
- 798.6 to 2640.4 g of alkylene oxide mixture: There was a linear increase in the metering rate from 518.0 g/h to 816.0 g/h as a function of the mass of alkylene oxide mixture metered in, reaction temperature: 130° C.,
- 2640.4 to 2784.1 g of alkylene oxide mixture: The metering rate remained constant at 816.0 g/h, reaction temperature: 130° C.,
- 2784.1 to 4316.6 g of alkylene oxide mixture: There was a linear decrease in the metering rate from 816.0 g/h to 427.0 g/h and a linear decrease in the reaction temperature from 130° C. to 123° C. as a function of the mass of alkylene oxide mixture metered in,
- 4316.6 to 5390.2 g of alkylene oxide mixture: The alkylene oxide mixture metering rate was left at 427.0 g/h and the reaction temperature was left at 123° C. With 4316.6 g of alkylene oxide mixture metered in, a theoretical equivalent molar mass of 8097 g/mol had been attained. In this last metering phase, alkylene

The invention claimed is:

1. A process for preparing a polyoxyalkylene polyol comprising reacting at least one H-functional starter compound with at least one alkylene oxide in the presence of a double metal cyanide catalyst in a reactor, by supplying the reactor continuously or discontinuously with the at least one alkylene oxide from a time $t_1$ until a time $t_3$, and by previously commencing supply of the reactor with a portion of the total amount of the at least one alkylene oxide to be fed in for preparation of the desired polyoxyalkylene polyol from an earlier time to wherein from a time $t_2$ the mean metering rate $r_{AO}$ with which the at least one alkylene oxide is supplied to the reactor is not more than 42 h$^{-1}$, in which $t_3 \geq t_2 \geq t_1$, and $$r_{AO} = \frac{n_{AO}}{n_{OH} \cdot \Delta t} \cdot OHN_{target} / (mg_{KOH} \cdot g^{-1}),$$

wherein $\Delta t$: represents a period of time from $t_2$ until the time of ending of the alkylene oxide addition ($t_3$) in h, $n_{AO}$: represents the molar amount n of alkylene oxide in mol added in total over the period of time $\Delta t$, $n_{OH}$: represents the total molar amount n of hydroxyl groups in the starter compound used in mol, $$OHN_{target} = \frac{m_S \cdot OHN_S}{m_R};$$

$OHN_S$: represents the hydroxyl number of the at least one starter compound in mg KOH/g, $m_S$: represents the total mass of the at least one starter compound used in g, $m_R$: represents the total mass of all reactants supplied to the reactor after ending of the alkylene oxide addition in g, where the time $t_2$ is chosen such that the polyoxyalkylene polyol present in the reactor at this time has a calculated equivalent molar mass $M(t_2)_{equiv.}^{calc.}$ in the range from 8000 g·mol$^{-1}$ to 9500 g·mol$^{-1}$, where, in addition, the at least one alkylene oxide from the time $t_1$ and at least until the time corresponding to the attainment of a calculated equivalent molar mass $M(t)_{equiv.}^{calc.}$ of 8000 g·mol$^{-1}$ and at most until the time corresponding to the attainment of a calculated equivalent molar mass $M(t)_{equiv.}^{calc.}$ of 9500 g·mol$^{-1}$ is supplied to the reactor so as to attain a total alkylene oxide metering time, defined as the period of time $\Delta t_{30}=t_3-t_0$, of 0.5 h to 13 h, where $$M(t)_{equiv.}^{calc.} = \frac{m_R^t}{m_S \cdot OHN_S} \cdot (56100 \text{ mg}_{KOH} \cdot \text{mol}^{-1}),$$

in which $m_R^t$: represents the total mass of all reactants supplied to the reactor up to a given time t in g.

2. The process as claimed in claim 1, wherein the polyoxyalkylene polyol, after the total alkylene oxide metering time has elapsed, has a calculated equivalent molar mass of 9500 g·mol$^{-1}$ to 23,000 g·mol$^{-1}$.

3. The process as claimed in claim 1, wherein an alkylene oxide portion of up to 20% by mass of alkylene oxide, based on the amount of the at least one H-functional starter compound used, is supplied from a time to until a time not later than $t_1$.

4. The process as claimed in claim 1, comprising ($\alpha$) initially charging the reactor with the double metal cyanide catalyst and the at least one H-functional starter compound and, at a temperature of 60° C. to 160° C., introducing an inert gas into the mixture of double metal cyanide catalyst and the at least one H-functional starter compound, and simultaneously establishing a reduced pressure of 5 mbar to 500 mbar (absolute) by removing the inert gas ("stripping"), ($\beta$) then feeding the at least one alkylene oxide into the mixture from step ($\alpha$) in the reactor ("polymerization"), wherein commencing the supply of the alkylene oxide in ($\beta$) marks the time $t_1$.

5. The process as claimed in claim 1, comprising ($\alpha$) ($\alpha$1) initially charging the reactor with the double metal cyanide catalyst and the at least one H-functional starter compound and, at a temperature of 60° C. to 160° C., introducing an inert gas into the mixture of double metal cyanide catalyst and the at least one H-functional starter compound, and simultaneously establishing a reduced pressure of 5 mbar to 500 mbar (absolute) by removing the inert gas ("stripping"), ($\alpha$2) adding a first a portion of the total amount of the at least one alkylene oxide to be metered in to the mixture from ($\alpha$1) from the time $t_0$ ("activation"), ($\beta$) then feeding the remaining amount of the at least one alkylene oxide is to the reactor ("polymerization"), wherein commencing the supply of the alkylene oxide in ($\beta$) marks the time $t_1$.

6. The process as claimed in claim 5, comprising ($\alpha$2) adding 2.0% by mass to 20% by mass, based on the amount of the at least one H-functional starter compound used in ($\alpha$1), of the at least one alkylene oxide and, ($\beta$), feeding the remaining portion of the total amount of the at least one alkylene oxide for preparation of the desired polyoxyalkylene polyol.

7. The process as claimed in claim 1, wherein the reaction with at least one alkylene oxide is conducted from the time $t_1$ at a temperature of 110° C. to 150° C.

8. The process as claimed in claim 1, wherein the at least one starter compound has a functionality of 2 to 8.

9. The process as claimed in claim 1, wherein the at least one alkylene oxide has 2 to 24 carbon atoms.

10. The process as claimed in claim 1, wherein the alkylene oxide comprises ethylene oxide, propylene oxide or a mixture of ethylene oxide and propylene oxide.

11. The process as claimed in claim 10, wherein the alkylene oxide comprises propylene oxide.

12. The process as claimed in claim 10, wherein the alkylene oxide comprises a mixture of propylene oxide and ethylene oxide which contains up to 75% by mass of ethylene oxide, based on the total mass of the mixture of ethylene oxide and propylene oxide.

13. The process as claimed in claim 1, in which the double metal cyanide catalyst is present in a proportion by mass of 10 ppm to 1000 ppm, based on the total mass of the reaction mixture in the reactor at the time $t_3$.

14. The process as claimed in claim 1, wherein $t_3 > t_2 > t_1$.

15. The process as claimed in claim 1, wherein the total alkylene oxide metering time, defined as the period of time $\Delta t_{30}=t_3-t_0$, of 1 h to 12 h.

16. The process as claimed in claim 1, wherein the total alkylene oxide metering time, defined as the period of time $\Delta t_{30}=t_3-t_0$, of 1.5 h to 11 h.

17. The process as claimed in claim 2, wherein the polyoxyalkylene polyol has a calculated equivalent molar mass of 9550 g·mol$^{-1}$ to 23,000 g·mol$^{-1}$.

18. The process as claimed in claim 2, wherein the polyoxyalkylene polyol has a calculated equivalent molar mass of 9550 g·mol$^{-1}$ to 20,000 g·mol$^{-1}$.

19. The process as claimed in claim 8, wherein the at least one starter compound has a functionality of 2 to 3.

* * * * *